Dec. 31, 1940.  R. D. AMSDEN  2,227,118

CONTROL SYSTEM

Filed Aug. 13, 1938

Inventor:
Ralph D. Amsden,
by Harry E. Dunham
His Attorney.

Patented Dec. 31, 1940

2,227,118

UNITED STATES PATENT OFFICE 2,227,118

CONTROL SYSTEM

Ralph D. Amsden, Lynn, Mass., assignor to General Electric Company, a corporation of New York Application August 13, 1938, Serial No. 224,749

6 Claims. (Cl. 171—314)

This invention relates to electrical control systems and more particularly to improvements in time controlled battery charging systems.

A well known way of charging a storage battery is to charge it at a relatively high rate until a predetermined battery voltage is reached and then automatically reduce the charging rate to a finishing value which is maintained for a definite and predetermined time and, finally, interrupting the charging circuit at the expiration of this time.

In accordance with this invention I provide a circuit of the above type which is characterized by a novel combined manual control switch and electrically driven timing means for opening the switch and de-energizing the timing means at the expiration of selectively adjustable time periods. At any time during the timing operation the switch may be manually operated to shut down the system, or the timing means may be reset to the beginning of the timing period.

Another feature of the invention is the provision of means for selectively changing the charging system from one which is adapted to charge lead-acid batteries to one which is adapted to charge nickel-iron-alkaline or so-called Edison batteries.

An object of this invention is to provide a new and improved electrical control system.

Another object of this invention is to provide a new and improved combined manually-controlled, electrically-driven time switch.

A further object of this invention is to provide a new and improved charging system.

The invention will be better understood from the following description taken in connection with the accompanying drawing and its scope will be pointed out in the appended claims.

Figure 1:
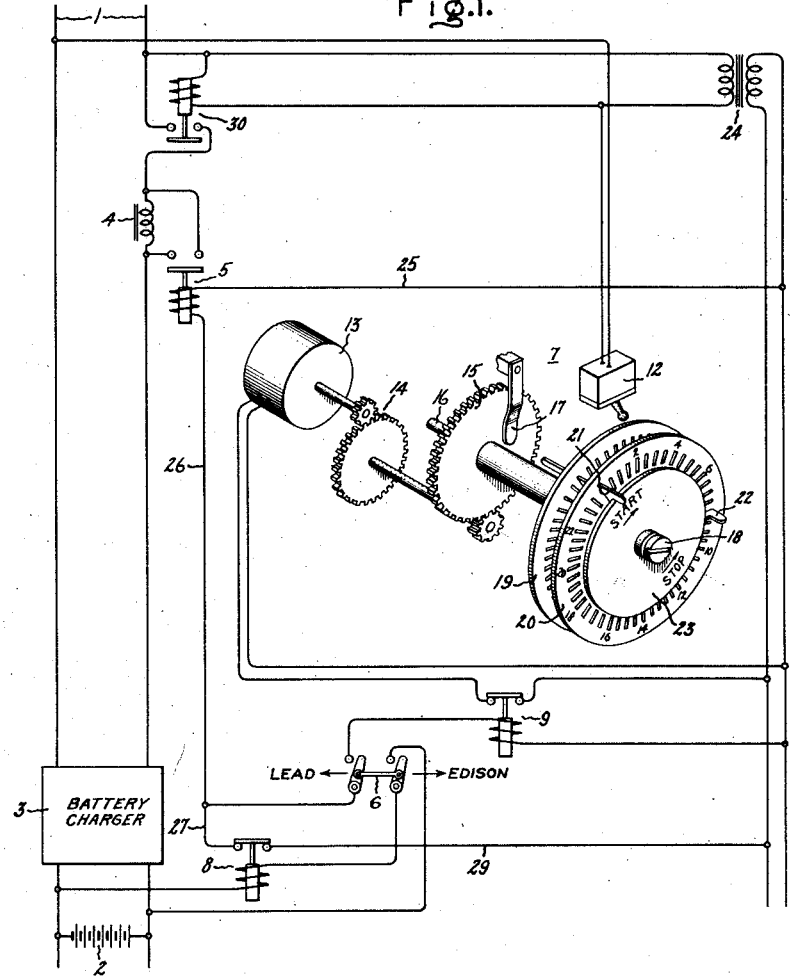
Figure 2:
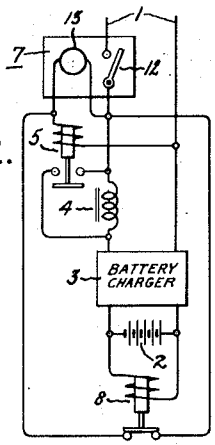

In the drawing, Fig. 1 is a diagrammatic illustration of an embodiment of the invention which is provided with means adapted to charge selectively both lead and Edison type batteries, and Fig. 2 illustrates diagrammatically a simplified modification.

Referring now to the drawing and more particularly to Fig. 1, there is shown therein a supply circuit 1 for supplying charging current to a storage battery 2. Interposed between the supply circuit and the battery is a battery charger 3 which may be of any suitable and well-known type and which will consist essentially of a rectifier (with or without a transformer) if the supply circuit is an alternating current circuit, as is usually the case. For controlling the charging current there is connected in the supply circuit an impedance 4 which is shown by way of example as a reactor. This reactor is adapted to be short circuited by means of a relay 5. By means of a transfer switch 6 this relay is selectively controllable by either a combined manual control and time switch 7 or a battery voltage responsive relay 8. Transfer switch 6, in combination with an auxiliary relay 9, also selectively controls the starting of the time switch either immediately or in response to battery voltage by means of the relay 8.

The combined manual control and time switch includes by way of example a conventional tumbler type snap switch 12. For causing automatic time controlled opening of switch 12 there is provided a driving motor 13 which is preferably a self-starting synchronous motor of well-known construction. This motor drives reduction gearing 14. The last gear 15 of the reduction gear train is axially slidable on a shaft 16. It is biased into a meshing position by means of a spring 17 but by means of a knob 18 it may be unmeshed and rotated manually independently of the gear train and its driving motor. Mounted for rotation with the gear 15 are a pair of axially spaced concentric plates 19 and 20 having a plurality of registering openings or slots, in any two of which may be inserted pins or keys 21 and 22. These keys are retained in position by means of a face plate 23 which, in turn, is retained in position by means of the knob 18 which may be threaded to an axial extension of the plate assembly.

The motor 13 may be arranged to rotate in either direction. If it rotates in such a direction as to cause the plates 19, 20 and 23 to turn in a counter-clockwise direction, the key 21 will be the "on" key and the key 22 will be the "off" key. That is to say, if the gear 15 is moved axially so as to be unmeshed from its driving gear and is then rotated in a clockwise direction, the pin 21 will engage the tumbler switch 12 and close it. If now the knob 18 is released the spring 17 will remesh the gears and the motor 13 will drive the key 21 away from the switch and will drive the key 22 toward the switch and after a predetermined time, the key 22 will open the switch 12. The time setting may be adjusted over a wide range by unscrewing the knob 18, removing the plate 23 and shifting the position of the "off" key 22 with respect to the "on" key 21.

The switch 12 is connected in circuit with the primary winding of an auxiliary supply transformer 24 which is energized from across the supply circuit 1. The motor 13 is connected to be energized by the auxiliary supply transformer through the contacts of the auxiliary relay 9. The relay 5 is connected to be energized by the auxiliary supply transformer 24 through the contacts of the battery voltage relay 8, the circuit being from the right hand output lead of the secondary winding of the auxiliary supply transformer through a conductor 25, relay 5, conductor 26, conductor 27, the contacts of relay 8 and a conductor 29 to the left-hand lead of the secondary winding of the supply transformer 24. One pole of the transfer switch 6 controls the connection and disconnection of the voltage relay 8 across the terminals of the battery and the other pole of the transfer switch controls the connection and disconnection of the auxiliary relay 9 in parallel with the relay 5.

A line contactor 30 is connected in parallel with the supply transformer 24 so as to be controlled by the main control switch 12.

The operation of Fig. 1 is as follows: With the transfer switch 6 in its open position, as shown, the circuit is adapted to charge Edison type batteries which do not need to have the low finishing rate that lead batteries require for best results. If now the switch 12 is closed by pulling the knob 18 out and rotating it in a clockwise direction until the switch closes and then releasing the knob, the auxiliary supply transformer 24 and the line contactor 30 will be energized. The motor 13 will be energized by the transformer through the contacts of the de-energized relay 9 and the relay 5 will be energized by the transformer through the contacts of the de-energized voltage relay 8. After a predetermined time the timer will open the switch 12, thereby simultaneously automatically de-energizing the timer and the line contactor 30, which automatically shuts down the charger.

If now the transfer switch 6 is moved to its closed position and the circuit is started by manually closing the switch 12, the operation will initially be voltage controlled because the closure of the switch 6 energizes the relay 9, thus preventing energization of the timer motor 13, and at the same time it connects the voltage relay 8 across the battery. The short circuiting of the impedance 4 by the relay 5 causes the battery to be charged at a relatively high rate. As the battery charge continues the battery voltage rises until at a predetermined battery voltage the relay 8 picks up simultaneously de-energizing the relays 5 and 9, thereby simultaneously reducing the charging rate and starting the timer. When the timer times out and opens the switch 12, the circuit is automatically shut down by the de-energization of line contactor 30.

Fig. 2 is best adapted for charging lead-acid batteries rather than nickel-alkaline batteries because it automatically provides a low finishing rate of charge for a predetermined time after the battery voltage has risen to a predetermined value corresponding approximately to a fully charged state. Consequently, the transfer switch 6 is not used and the circuit is further simplified by eliminating the auxiliary relay 9 and the line contactor 30.

In the operation of Fig. 2 the circuit is started by manually closing the main control switch 12. If the battery 2 is in a discharged condition, its voltage will be below the pick up voltage of the relay 8 and, consequently, the relay 8 will be closed and its contacts will connect the relay 5 across the supply circuit and at the same time they will short circuit the motor 13. The energization of the relay 5 across the line will cause it to pick up and short circuit the impedance 4 with the result that the battery is charged at a relatively high rate. As soon as the battery voltage rises to the value corresponding to the pick-up voltage of relay 8 this relay will open its contacts, thereby de-energizing the relay 5 and removing the short circuit around the motor 13. The motor 13 and the winding of relay 5 will now be connected directly in series across the supply circuit and the impedances of these devices are so correlated that the amount of current required to operate the motor 13 will be insufficient to cause the relay 5 to pick up. Consequently, the series impedance 4 limits the charging current to a relatively low finishing value and the motor 13 operates the timing mechanism for causing delayed opening of the switch 12. When the timing out period has elapsed, the motor will open the switch 12, thereby de-energizing the circuit and restoring it to its original condition. It is now ready for another cycle of operation when the battery again becomes discharged.

While there have been shown and described particular embodiments of this invention, it will be obvious to those skilled in the art that various changes and modifications can be made therein without departing from the invention and, therefore, it is aimed in the appended claims to cover all such changes and modifications as fall within the true spirit and scope of the invention.

What I claim as new and desire to secure by Letters Patent of the United States is:

1. In combination, an alternating current supply circuit, a storage battery, a battery charging rectifier interconnecting said supply circuit and said battery, a battery voltage responsive relay having a set of contacts which are closed when the battery voltage is below a predetermined value and which are open when the battery voltage is above said predetermined value, means including an electro-responsive device for increasing the battery charging rate when it is energized and decreasing the battery charging rate when it is de-energized, a switch which is manually operable at any time to control the opening and closing of said supply circuit, means including a motor for causing a time delayed automatic opening of said switch, said motor and electro-responsive device being connected in series circuit relation across said supply circuit on the rectifier side of said switch, said motor being proportioned to have an operating current which is insufficient to cause actuation of said electro-responsive device, the contacts of said battery voltage responsive relay being connected respectively to the terminals of said motor whereby said motor is short circuited and said electro-responsive device is actuated when said switch is closed and the voltage of said battery is below said predetermined value.

2. In combination, an alternating current supply circuit, a storage battery to be charged, a rectifier interconnecting said supply circuit and said battery, a battery voltage relay connected across said battery and having a pair of contacts which are closed when the battery voltage is below a predetermined value and which are open when the battery voltage is above said predetermined value, a main switch which is manually operable at any time to cause selective opening and closing of said supply circuit, a synchronous motor for causing time delayed opening of said switch, means including an electro-responsive device for reducing the battery charging rate when said electro-responsive device is actuated and for decreasing the battery charging rate when said electro-responsive device is deactuated, an auxiliary relay for controlling the energization of said synchronous motor, a circuit controlled by said main switch for energizing said electro-responsive device through the contacts of said battery voltage relay, and a manually operable transfer switch for selectively making and breaking the circuit of said battery voltage responsive relay and for selectively connecting and disconnecting said auxiliary relay in parallel with said electro-responsive device.

3. In combination, a battery charging circuit, a manually operable main control switch for controlling the making and breaking of said circuit, electrically driven means for causing a time delayed opening of said main control switch, electro-responsive means for reducing the output of said charging circuit, a battery sensitive relay, and a manually operable transfer switch having a first position for adapting said circuit to charge an Edison type battery and having a second position for adapting said circuit to charge a lead battery, means co-operating with said transfer switch in its first position for connecting said electrically driven means to be energized whenever said main control switch is actuated to complete said charging circuit, said transfer switch in its second position putting the energization of said electrically driven timing means and the energization of said electroresponsive means under the control of said battery voltage sensitive relay, said battery voltage sensitive relay being arranged when it is energized by a predetermined voltage to cause energization of said electrically driven timing means and operation of said electroresponsive means to reduce the output of said charger.

4. In combination, a battery charging circuit, a battery connected to be charged thereby, a manually operable switch in said circuit, electrically energized means for causing time delayed opening of said switch, electroresponsive means for reducing the current supplied by said circuit to said battery when said electroresponsive means is de-energized, said electrically energized means and said electroresponsive means being connected in series circuit relation across said circuit between said switch and said battery, the normal operating current for said electrically energized means being insufficient to cause operative energization of said electroresponsive means, and a relay connected across said battery and having a pair of normally closed contacts which open in response to a predetermined battery voltage, said contacts being connected to short circuit said electrically energized means.

5. In combination, a storage battery, a circuit for charging said battery, means for connecting and disconnecting said battery from said circuit, means for changing the battery charging rate between a relatively high value and a relatively low value, an electrically driven timing mechanism for causing time delayed operation of the means for disconnecting said battery from said circuit, means for adjusting the time setting of said electrically driven mechanism, a battery voltage responsive relay, connections for causing said relay to make said charging rate changing means reduce the charging rate of said battery and also energize said timing means when the battery votage reaches a predetermined value, and a manually operable transfer switch for energizing said electrically driven timing means independently of the voltage of said battery whenever said battery is connected to said circuit and for causing said charging rate controlling means to charge said battery at said relatively high value independently of the battery voltage throughout the timing period of said electrically driven timing means.

6. In combination, a battery charging rectifier having alternating current input terminals and direct current output terminals, a reactor, a main control switch, an alternating current supply circuit connected to said input terminals through said reactor and main control switch in series, means including a rotatable member for opening said switch when said member is rotated a given amount in one direction and for closing said switch when said member is rotated a given amount in the opposite direction, means for adjusting the valve of said given amount of rotation, a synchronous alternating current motor, manually operable means for permitting selective manual rotation of said member in either direction and automatic rotation of said member by said motor in the direction to cause opening of said switch, a storage battery and a voltage relay connected in parallel across said output terminals, said relay being arranged to short circuit said reactor and to de-energize said motor when the voltage of said battery is below a predetermined value, said relay being further arranged to open the short circuit around said reactor and to connect said motor to be energized by said supply circuit under the control of said main switch when the battery voltage exceeds said predetermined value whereby if said main switch is then closed the energization of said motor will cause time delayed opening of said main switch.

RALPH D. AMSDEN.